Patented July 22, 1930

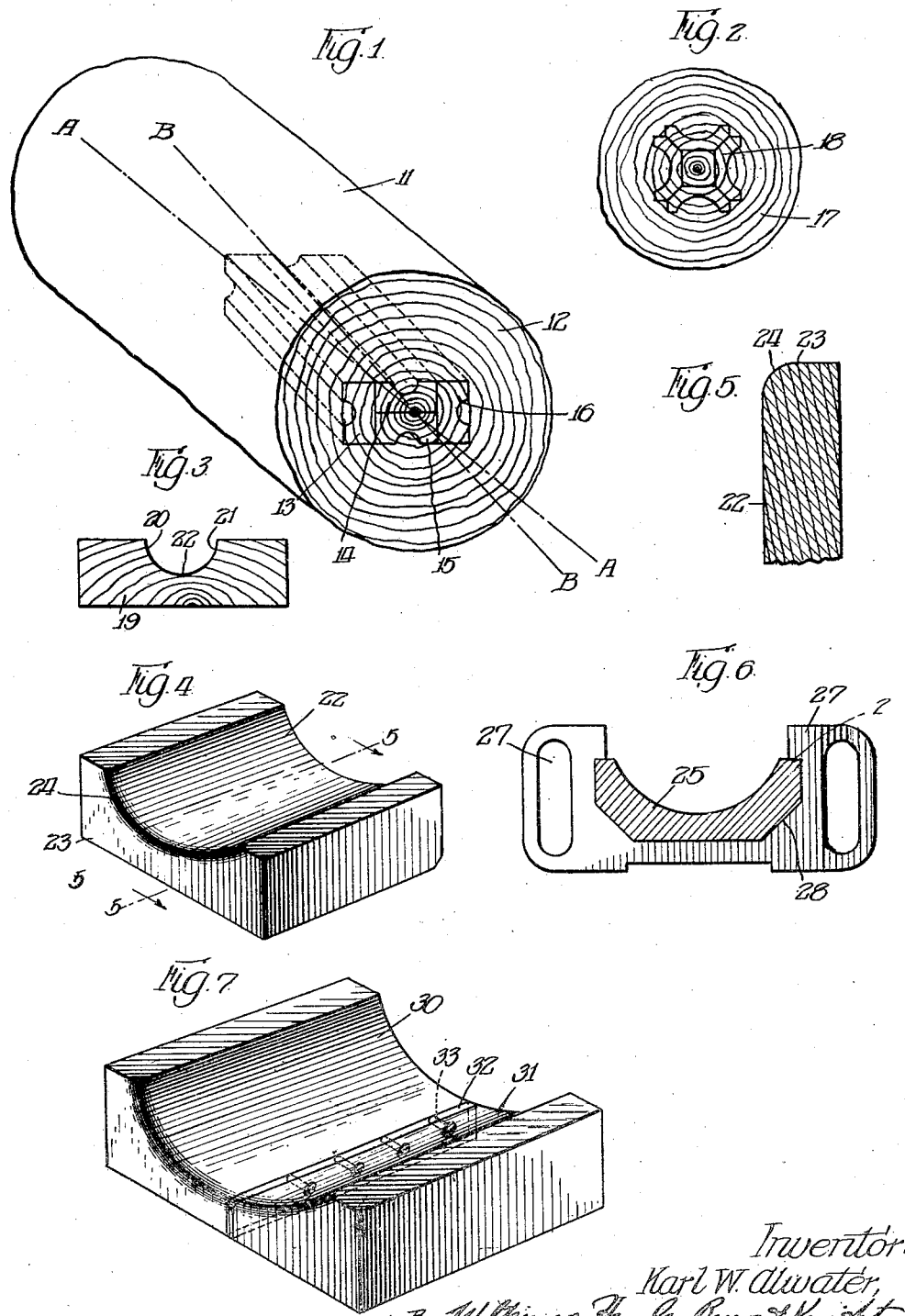

1,771,108

UNITED STATES PATENT OFFICE

KARL W. ATWATER, OF CHICAGO, ILLINOIS

BEARING CONSTRUCTION

Application filed March 11, 1929. Serial No. 346,109.

This invention relates to a new and improved bearing construction, and more particularly to a bearing formed of wood and especially adapted for use in connection with rolling mills of the hot mill or high speed types and for similar heavy apparatus.

Rolling mills and the like are now commonly provided with metal bearings which must be kept lubricated and also cooled with a water flow, and which wear out comparatively rapidly in service. These bearings are expensive to install and to maintain.

According to the present invention the bearing is made of wood and more particularly of lignum vitæ. The six various species of lignum vitæ have been carefully considered and it has been found that one particular species "*Guaiacum officinale*", which is popularly known as "Guayacan Negro", is the most efficient and has the longest life in heavy duty bearing construction. This lignum vitæ is obtainable in the form of logs and the outer inch or more of the log is not suitable for bearing purposes as it does not contain an adequate quantity of the natural lubricant which is present in the heart of the log. It is essential, therefore, that the bearings be cut from the central portion of the log, and it is also important that the bearings be cut in a particular manner to present the grain properly upon the bearing surfaces.

In rolling mill practice, the bearing is subjected to endwise strains due to the tendency of the rolls to work longitudinally of their axis and is also subjected to vertical strains due to the pressure applied by the screwdown upon the roll necks from above. There is further a heavy horizontal stress upon the bearing due to the tendency of the rolls to move laterally as the metal is forced between them. Consequently, a roll neck bearing undergoes heavy stresses in three directions.

It is an important part of my invention to so cut the bearings from a log as to present an edge grain against all of these thrusts.

It is an object of the present invention to provide a new and improved bearing and more particularly a wooden bearing formed of lignum vitæ.
It is an additional object to provide more specifically a bearing formed of the lignum vitæ known as "*Guiacum officinale*", and so constructed as to present edge grain to the thrust to be encountered.

It is also an object to provide a bearing so designed as to afford a maximum volume of material to be worn away in service, with a consequent minimum of waste.

Other and further objects will appear as the description proceeds.

I have shown certain preferred embodiments of my invention in the accompanying drawings, in which—

Figure 1 is a somewhat diagrammatic perspective of a log showing one manner of cutting bearings therefrom;

Figure 2 is an end view of a different method of cutting the bearings, whereby waste of material is reduced;

Figure 3 is an end view of one form of bearing illustrating the grain;

Figure 4 is a perspective of a generally similar form of bearing;

Figure 5 is a section on line 5—5 of Figure 4;

Figure 6 is an end view of a modified form of bearing; and

Figure 7 is a perspective showing a modified form of bearing.

In the drawings, the log of lignum vitæ is shown at 11, having a cut end 12 upon which the grain has been indicated. The axis of the log is indicated by the broken line A—A. A group of four bearings 13, 14, 15 and 16 have been indicated largely in broken lines, showing the manner of cutting them from the log. The axis of these bearings is indicated by the broken line B—B. It will be apparent that this axis is offset several degrees from the axis of the log.

Figure 2 shows the end 17 of a log with a series of bearings 18 cut from the log, the bearings being in a different relative position than those of Figure 1. With the bearings in this position there is less waste of material and the bearings can be cut from smaller logs with the proper grain in the bearings.

Figure 3 shows clearly the end grain at the end of the bearing 19. It will be noted that this grain is so related to the bearing surface that upon both sides 20 and 21 of the bearing any lateral or horizontal thrust is against an edge of the grain.

The fragmentary section of Figure 5 which is taken on line 5—5 of Figure 4, shows also the grain and makes it clear that the bottom 22 of the bearing seat also is against an edge grain and not flatly parallel to the run of the grain. This is brought about by the angular cut shown in Figure 1. It will also be apparent from Figure 5 that the end 23 and rounded shoulder 24 against which the fillet at the juncture of the roll and roll neck bears, presents an end grain against this end thrust.

In Figure 6 a bearing 25 is shown fitted into a metal chuck or box 26. This box is secured into the roll stand by suitable securing means passing through the slotted end openings 27. This bearing 25 is provided with cutaway corners 28 which, together with the shoulders 29, hold the bearing positively in the chuck and prevent its rotation. This bearing is also designed so that as the bearing surface wears down, the thickness of the bearing is approximately constant over its area so that there is a minimum of lost material when the old bearing is removed and the new one substituted.

In Figure 7 has been shown a form of bearing suitable for use where large bearings are required. This bearing consists of two halves 30 and 31 which together make up a bearing of the proper contour. It is desirable to make large bearings in two parts since large logs of the lignum vitæ are not commercially available and it is important that the wood for the maximum service should come from the heart of the log. In order to prevent wear between the two sections of the bearing, the member 30 has been shown as provided with a facing plate 32 held in place by screws 33. This plate 32 is preferably formed of brass or bearing babbitt. The two halves of the bearing are not directly secured together but are held together by the bearing chuck or box, and the plate 32 prevents wear between the two halves of the bearing.

My improved bearing in service requires only to be kept wet with a flow of water to keep it cool and does not require grease or other lubricant. The natural lubricant present in the wood renders further lubrication unnecessary and consequently results in a very considerable saving in the cast of lubricant. The lignum vitæ bearing has also been found in practice to have an effective life, two or three times that of the usual metal bearings.

While I have shown preferred forms of bearing construction, it will be understood that the bearings may be made in a variety of forms to adapt themselves to varying types of rolling mills and other similar heavy machinery. I contemplate therefore, such changes and modifications as come within the spirit and scope of the appended claims.

I claim:

1. A wooden bearing for receiving a rotating cylindrical member with a shoulder adjacent its end, said bearing being cut at an angle to the axis of a log and presenting an edge grain toward vertical and lateral thrusts from the member and end thrusts from the shoulder.

2. A unitary wooden bearing of lignum vitæ said bearing being cut at an angle to the axis of a log having an edge grain presented against lateral, vertical and end thrusts.

3. A unitary wooden bearing for rolling mills formed of *Guaiacum officinale*.

4. A wooden bearing for rolling mills formed of *Guaiacum officinale*, said bearing having a bearing portion cylindrical in contour with a rounded end and with an edge grain presented at the sides and bottom of the cylindrical portion and at the rounded end.

5. A bearing of *Guaiacum officinale* having a cylindrical bearing surface and cut in such manner that the direction of vertical thrust of the bearing is substantially toward the center of the log of wood from which the bearing is cut.

Signed at Chicago, Illinois, this 6th day of March, 1929.

KARL W. ATWATER.